Patented Oct. 22, 1946

2,409,832

UNITED STATES PATENT OFFICE 2,409,832

ARYL-DICYANDIAMIDE PRODUCTION

Wallace Broadbent and Francis Leslie Rose, Blackley, Manchester, England, assignors to Imperial Chemical Industries Limited, a corporation of Great Britain No Drawing. Application May 25, 1945, Serial No. 595,891. In Great Britain May 10, 1944

6 Claims. (Cl. 260—551)

This invention relates to an improved process for the manufacture of aryl-dicyandiamides, otherwise known as aryl-cyanoguanidines.

Aryl-dicyandiamides are known, having been made by interaction of dry aryl-azo-dicyandiamides with hydrogen chloride in ether and subsequent decomposition by hot water of the addition compounds first formed—see Walther and Grieshammer, Journal für praktische Chemie (2) 92, pp. 209–255, particularly pp. 250–251. This process is, however, unsuitable for use on the manufacturing scale because of its employment of large proportions of a highly inflammable organic solvent and because dry aryl-azo dicyandiamides are explosive.

Walther and Grieshammer also showed (see particularly p. 214) that aryl-azo-dicyandiamides when heated with water or dilute acids decomposed to give the corresponding phenol, dicyandiamide and nitrogen but that by working in concentrated acid or by suspending the compound in alcohol and passing in hydrogen chloride, the product is the phenyl guanylurea. Thus hydrogen chloride is ether (i. e. working in the absence of water) followed by decomposition of the addition product with water gave the aryl-dicyandiamide; hydrogen chloride in alcohol gave the aryl-guanylurea; hydrogen chloride (concentrated) in water likewise gave the aryl-guanylurea; while dilute acid led to a more extensive hydrolysis, yielding the phenol and dicyandiamide. We have now found, surprisingly, that the aryl-dicyandiamide can be obtained, in a single operation, by working in the presence of water provided that a water-soluble organic liquid such as acetic acid, ethanol, acetone, dioxan or β-ethoxyethanol is used as the reaction medium.

Thus according to the present invention we make aryl-dicyandiamides, wherein the aryl group may bear substituents, by a process comprising bringing the corresponding aryl-azo-dicyandiamide into reaction with a strong acid in the presence of a water-soluble organic solvent and a substantial proportion of water.

We thus secure several important advantages, notably, we obtain the aryl-dicyandiamide in one simple operation instead of two, we work at lower temperatures, we avoid the use of highly inflammable reaction media and, finally, we are enabled to use the starting material, the aryl-azo-dicyandiamide, in the form of a wet aqueous filter-paste, thus avoiding the hazards involved in drying it and handling the explosive dry material.

The water-soluble solvent may be neutral or may itself be an acid. For example, very good yields are obtained using β-ethoxyethanol, dioxan, methanol, ethanol, acetone or acetic acid. High yields are obtained when the total amounts of solvent and water present at the end of the reaction are such that the reaction product remains in solution. The reaction product is then conveniently precipitated by adding more water.

As the strong acid we prefer to use a strong mineral acid such as hydrochloric acid, sulphuric acid or nitric acid. Preferably the acid is added to the organic solvent in admixture with water, for example, hydrochloric acid is used in the form of a 36 per cent solution in water.

The reaction is best carried out at temperatures of about 20°–40° C. Lower temperatures reduce the speed of the reaction and higher temperatures tend to produce unwanted by-products. The optimum temperature is the lowest at which a brisk evolution of nitrogen occurs. The reaction in most cases is feebly exothermic so that the arylazodicyandiamide is preferably added in portions over a period of time such as ½–1 hour.

The aryl-azo-dicyandiamides used as starting materials may be made by alkaline coupling of an appropirate aryldiazonium compound with dicyandiamide—see Walther and Grieshammer p. 211.

The following examples illustrate, but do not limit, the invention. The parts are by weight.

Example 1

64 parts of p-chloroaniline are dissolved by heating in a mixture of 100 parts of water and 130 parts of 36% hydrochloric acid. The solution is cooled to 15° C. and the resultant suspension is diazotized by adding 35 parts of sodium nitrite dissolved in 100 parts of water. This diazo solution is then gradually added to a solution of 46 parts of dicyandiamide in 1400 parts of water, stirred at 20° C. Throughout the addition sodium carbonate is added in portions so as to maintain a strongly alkaline reaction. When the coupling is finished the resultant suspension is filtered and the solid is washed with water and sucked as dry as possible on a vacuum filter.

The wet filter paste of p-chlorophenylazodicyandiamide obtained as described above is added during 30 minutes to a stirred mixture of 420 parts of β-ethoxyethanol and 67 parts of 36% hydrochloric acid kept at 20°–30° C. When no more nitrogen is evolved there are added 375 parts of water and then sufficient sodium acetate to remove the acid reaction to Congo Red. A further 800 parts of water are then added and the crude p-chlorophenyldicyandiamide is thus precipitated in an easily filterable form. It is filtered off and purified by dissolving it in 450 parts of a hot 5% solution of caustic soda, filtering from insoluble impurity and acidifying the clear filtrate with acetic acid. Pure p-chlorophenyldicyandiamide is precipated. It is filtered off and dried and then melts at 202.5°–203° C. uncorr.

By working in a similar manner but using other amines instead of p-chloroaniline as the primary starting material, there are obtained the corresponding phenyldicyandiamides, the melting points of which are given in the following table.

| Example No. | Amine | No. of parts | M. P. of the phenyldicyandiamide |
|---|---|---|---|
| | | | ° C. |
| 2 | Aniline | 46 | 196 –197. |
| 3 | p-Toluidine | 53 | 211.5–212.5. |
| 4 | p-Anisidine | 62 | 188 – 189. |
| 5 | p-Nitroaniline | 71 | 227 –229. |
| 6 | p-Acetylaminoaniline | 75 | 234 – 235. |
| 7 | 3:4-dimethylaniline | 60.5 | 217.5–218. |

As many widely different embodiments of this invention may be devised without departing from the spirit and scope thereof it is to be understood that the invention is not in any way limited to the specific embodiments illustrated, but only as defined in the following claims.

We claim:

1. A process for producing an aryl-dicyandiamide, which comprises reacting the corresponding aryl-azo-dicyandiamide with a strong mineral acid in a liquid medium consisting of water and a water-soluble organic liquid.

2. A process for producing an aryldicyandiamide, which comprises reacting the corresponding aryl-azo-dicyandiamide with aqueous hydrochloric acid in a solvent medium comprising a water-soluble organic liquid.

3. A process for producing an aryl-dicyandiamide, which comprises reacting the corresponding aryl-azo-dicyandiamide with aqueous hydrochloric acid in a solvent medium comprising a water-soluble organic liquid selected from the group consisting of β-ethoxyethanol, dioxane, methanol, ethanol, acetone and acetic acid.

4. Process as claimed in claim 1 wherein the reaction is carried out at a temperature in the range 20°–40° C.

5. Process which comprises the interaction of p-chlorophenyl-azo-dicyandiamide with a strong mineral acid in aqueous acetic acid at a temperature in the range 20°–40° C.

6. Process which comprises the interaction of p-chlorophenyl-azo-dicyandiamide with a strong mineral acid in aqueous β-ethoxyethanol at a temperature in the range 20°–40° C.

WALLACE BROADBENT.
FRANCIS LESLIE ROSE.